United States Patent
Chikamori et al.

(10) Patent No.: US 8,437,953 B2
(45) Date of Patent: May 7, 2013

(54) NAVIGATION APPARATUS AND ROUTE DISTRIBUTION SERVER

(75) Inventors: Hidetoshi Chikamori, Tochigi-ken (JP); Tadafumi Nogawa, Fujimi (JP); Koji Sengoku, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 509 days.

(21) Appl. No.: 12/716,009

(22) Filed: Mar. 2, 2010

(65) Prior Publication Data

US 2010/0250114 A1 Sep. 30, 2010

(30) Foreign Application Priority Data

Mar. 30, 2009 (JP) ................................. 2009-081338

(51) Int. Cl.
G01C 21/34 (2006.01)
G08G 1/0969 (2006.01)

(52) U.S. Cl.
USPC ........................................................ 701/420

(58) Field of Classification Search .................. 701/420, 701/421
See application file for complete search history.

(56) References Cited

U.S. PATENT DOCUMENTS

| | | | | |
|---|---|---|---|---|
| 6,028,553 A * | 2/2000 | Oberstein | ...................... | 342/457 |
| 6,662,105 B1 * | 12/2003 | Tada et al. | ...................... | 701/420 |
| 7,146,273 B2 * | 12/2006 | Kadono et al. | ................ | 701/420 |
| 7,865,305 B2 * | 1/2011 | Sengoku et al. | .............. | 701/416 |
| 2005/0256639 A1 * | 11/2005 | Aleksic et al. | ................ | 701/210 |
| 2007/0005239 A1 * | 1/2007 | Kirouchenaradje et al. | .. | 701/209 |
| 2008/0249711 A1 | 10/2008 | Matsuda | | |
| 2009/0112453 A1 * | 4/2009 | Mo et al. | ........................ | 701/119 |
| 2009/0143964 A1 * | 6/2009 | Navone et al. | ................ | 701/117 |

FOREIGN PATENT DOCUMENTS

| | | | | |
|---|---|---|---|---|
| JP | 07234996 A | * | 9/1995 | |
| JP | 10-160499 A | | 6/1998 | |
| JP | 2002-318124 A | | 10/2002 | |
| JP | 2002286473 A | * | 10/2002 | |
| JP | 2004-21503 A | | 1/2004 | |
| JP | 2004-77253 A | | 3/2004 | |
| JP | 2004-239918 A | | 8/2004 | |
| JP | 2006010639 A | * | 1/2006 | |
| JP | 2006349426 A | * | 12/2006 | |
| JP | 2007303951 A | * | 11/2007 | |
| JP | 2008-256659 A | | 10/2008 | |
| JP | 2009-019924 A | | 1/2009 | |

OTHER PUBLICATIONS

JPO machine translation of JP 2006-349426.*
JPO machine translation of JP 2007-303951.*

* cited by examiner

*Primary Examiner* — James Trammell
*Assistant Examiner* — David Testardi
(74) *Attorney, Agent, or Firm* — Arent Fox LLP

(57) ABSTRACT

A navigation apparatus associates a tentative searching condition for searching for a tentative route with each of a plurality of server searching conditions which are used by a route distribution server to search for a server route from a departure point to a destination. The navigation apparatus includes a tentative route searcher which searches for the tentative route under the tentative searching condition that is associated with one of the server searching conditions which is sent to the route distribution server.

6 Claims, 6 Drawing Sheets

| SERVER SEARCHING CONDITIONS | TENTATIVE SEARCHING CONDITIONS |
|---|---|
| FASTEST | STANDARD |
| FASTEST (GENERAL ROAD) | GENERAL ROAD PRIORITY |
| SMART ROUTE | STANDARD |
| FUEL EFFICIENT ROUTE | STANDARD |
| ETC DISCOUNT ROUTE | STANDARD |

FIG. 2

| SERVER SEARCHING CONDITIONS | TENTATIVE SEARCHING CONDITIONS |
|---|---|
| FASTEST | STANDARD |
| FASTEST (GENERAL ROAD) | GENERAL ROAD PRIORITY |
| SMART ROUTE | STANDARD |
| FUEL EFFICIENT ROUTE | STANDARD |
| ETC DISCOUNT ROUTE | STANDARD |

NAVIGATION APPARATUS AND ROUTE DISTRIBUTION SERVER

CROSS-REFERENCE TO RELATED APPLICATION

This application is based upon and claims the benefit of priority from Patent Application No. 2009-081338 filed on Mar. 30, 2009, in the Japan Patent Office, of which the contents are incorporated herein by reference.

BACKGROUND OF THE INVENTION

1. Field of the Invention

The present invention relates to a navigation apparatus for enabling mainly an external server or the like to search for a route up to a destination, and a route distribution server for use as such an external serve 2. Description of the Related Art Some known navigation apparatus for use on motor vehicles enable mainly an external information center to search for a route up to a destination (see, for example, Japanese Patent No. 3368775).

According to Japanese Patent No. 3368775, after sending information as to the present location of a motor vehicle and its destination to an external information center, the navigation apparatus performs route guidance using a tentative route found by a route setting means {navigation ECU (30)} of the navigation apparatus until it receives a route based on the sent information from the external information center (see, for example, FIG. 4 and paragraphs [0012], [0036] of Japanese Patent No. 3368775.

According to Japanese Patent No. 3368775, the route setting means {navigation ECU (30)} calculates a route cost according to the Dijkstra's algorithm based on link information and connection information, and sets a tentative route as a shortest route from the present position to the destination (see, for example, paragraphs [0012], [0036] of Japanese Patent No. 3368775). According to Japanese Patent No. 3368775, the navigation apparatus uses only one condition for searching for a tentative route. Therefore, it may possibly perform route guidance not intended by the user in the process of seeking a tentative route. For example, according to Japanese Patent No. 3368775, even when the user does not want to use a toll road such as an expressway or the like, if a toll road is included in a shortest route, then the navigation apparatus presents a route in which the user needs to use the toll road.

SUMMARY OF THE INVENTION

It is an object of the present invention to provide a navigation apparatus which is capable of searching for a tentative route which is closer to what the user intends, and a route distribution server for supporting such a navigation apparatus.

According to the present invention, there is provided a navigation apparatus for sending a departure point, a destination, and a server searching condition to a route distribution server for enabling the route distribution server to search for a server route from the departure point to the destination, receiving the server route which has been searched for by the route distribution server based on the departure point, the destination, and the server searching condition, and performing route guidance based on the server route, comprising a server searching condition receiver for receiving a plurality of server searching conditions from the route distribution server, a server searching condition selector for selecting either one of the server searching conditions based on an action of a user of the navigation apparatus, and a tentative route searcher for searching for a tentative route from the departure point to the destination after the destination is set, before the route guidance based on the server route is started, wherein each of the server searching conditions is associated with a tentative searching condition used to search for the tentative route, and the tentative route searcher searches for the tentative route under the tentative searching condition which is associated with one of the server searching conditions which is sent to the route distribution server.

The navigation apparatus can search for a tentative route under the tentative searching condition which is associated with the server searching condition which is selected by the user. Therefore, the navigation apparatus is able to search for a tentative route which is closer to what the user intends.

The navigation apparatus may further comprise a route searching condition memory for storing a plurality of tentative searching conditions, wherein the tentative searching condition which is associated with one of the server searching conditions that are received from the route distribution server is stored as one of the tentative searching conditions stored in the route searching condition memory.

The tentative searching conditions may include a condition which permits use of a toll road and a condition which permits use of a toll-free road only, and each of the server searching conditions may be associated with either one of the condition which permits the use of a toll road and the condition which permits the use of a toll-free road only. Therefore, only when the user permits the use of a toll road, the navigation apparatus can perform route guidance including a toll road in a tentative route. Stated otherwise, when the user does not want the use of a toll road, the navigation apparatus performs route guidance with no toll road included in a tentative route. Consequently, the navigation apparatus is capable of searching for a tentative route which is closer to what the user intends.

According to the present invention, there is also provided a route distribution server for receiving a departure point, a destination, and a server searching condition for searching for a server route from the departure point to the destination, from a navigation apparatus, searching for a server route that is a route obtained based on the departure point, the destination, and the server searching condition, and distributing the server route which has been searched for to the navigation apparatus, comprising a searching condition distributor for distributing a plurality of server searching conditions, wherein the searching condition distributor distributes the server searching conditions each in association with a tentative searching condition which is used by the navigation apparatus to search for a tentative route from the departure point to the destination.

The route distribution server distributes a plurality of server searching conditions and also an association between those server searching conditions and a plurality of tentative searching conditions to the navigation apparatus. Therefore, even if server searching conditions selectable in the navigation apparatus have changed, the association between the server searching conditions and the tentative searching conditions can be updated when needed.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a diagram showing by way of example a specific association between server searching conditions and tentative searching conditions;

DESCRIPTION OF THE PREFERRED EMBODIMENTS

[Overall Configuration]

Figure 1:
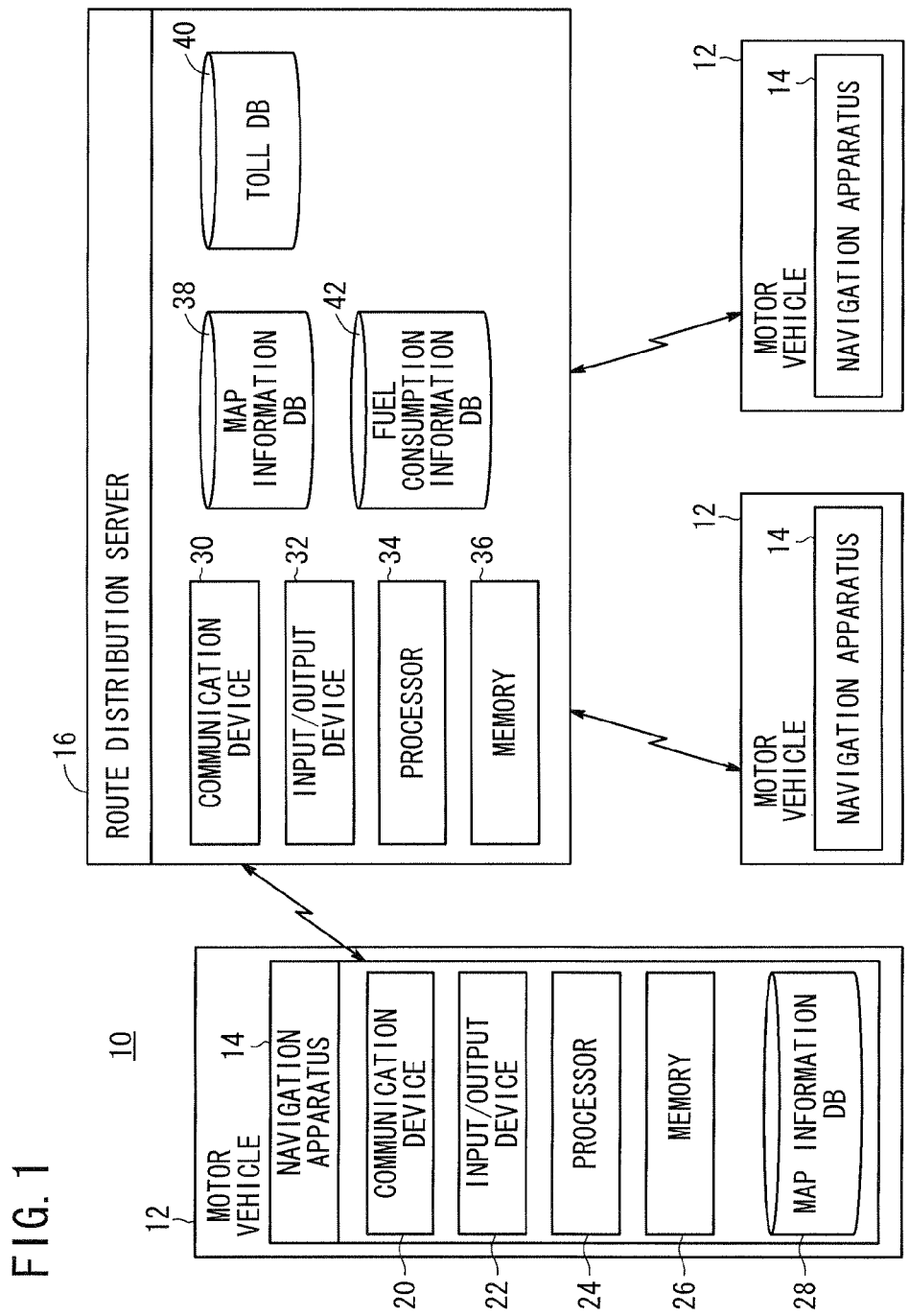
FIG. 1 is a schematic block diagram of a route guidance system including a navigation apparatus and a route distribution server according to an embodiment of the present invention.

FIG. 1 shows in schematic block form a route guidance system 10 (hereinafter also referred to as "system 10") including a navigation apparatus 14 and a route distribution server 16 (hereinafter also referred to as "server 16") according to an embodiment of the present invention. The system 10 provides route guidance to a plurality of motor vehicles 12 each incorporating the navigation apparatus 14. Since the motor vehicles 12 and their navigation apparatus 14 are basically identical in structure, only one motor vehicle 12 and its navigation apparatus 14 will be described in detail below.

The navigation apparatus 14 serves to give the user thereof a route up to a destination for the motor vehicle 12. The navigation apparatus 14 comprises a communication device 20, an input/output device 22, a processor 24, a memory 26, and a map information database 28 (hereinafter referred to as "map information DB 28").

The communication device 20 serves to perform wireless communications with the server 16. The input/output device 22 serves to input data to and output data from the navigation apparatus 14, e.g., to input a destination and output a route up to the destination, and includes a touch panel, a speaker, and the like. The processor 24 carries out various processing operations for controlling operation of various parts of the navigation apparatus 14 and performing route guidance. The memory 26 serves to store various programs and data for the navigation apparatus 14. The map information DB 28 stores map information and is used by the processor 24 when the processor 24 performs route guidance. The map information stored in the map information DB 28 includes link information about links interconnecting nodes, connection information about connections between the links, and information about toll-free roads (general roads) and toll roads (expressways, etc.).

According to the present embodiment, the navigation apparatus 14 causes the server 16 to search for a route up to a destination and performs route guidance based on the route indicated by the server 16 (hereinafter referred to as "server route"). In this manner, the navigation apparatus 14 can perform value-added route guidance. Until the navigation apparatus 14 acquires the server route from the server 16, the navigation apparatus 14 performs route guidance based on a tentative route which has been searched for by the navigation apparatus 14 itself.

Searching conditions under which the navigation apparatus 14 searches for a tentative route will hereinafter be referred to as "tentative searching conditions", which are different from searching conditions under which the server 16 searches for a server route, which will hereinafter be referred to as "server searching conditions".

The route distribution server 16 serves to search for a server route based on a departure point, a destination, and server searching conditions which are indicated by the navigation apparatus 14, and indicate to the navigation apparatus 14 the server route that is found. The route distribution server 16 comprises a communication device 30, an input/output device 32, a processor 34, a memory 36, a map information database 38 (hereinafter referred to as "map information DB 38"), a toll database 40 (hereinafter referred to as "toll DB 40"), and a fuel consumption information database 42 (hereinafter referred to as "fuel consumption information DB 42"). The departure point referred to above basically means the present position of the navigation apparatus 14, i.e., the motor vehicle 12. However, a location other than the present position may be designated as the departure point.

The communication device 30 serves to perform wireless communications with the communication device 20 of the navigation apparatus 14. The input/output device 32 serves to input data to and output data from the server 16, e.g., when the administrator of the server 16 operates the server 16, and includes a keyboard and a display monitor. The processor 34 carries out various processing operations for controlling operation of various parts of the server 16 and searching for a server route. The memory 36 serves to store various programs and data for the server 16. The data stored in the memory 36 include server searching conditions, tentative searching conditions, and an association between server searching conditions and tentative searching conditions (to be described in detail below).

The map information DB 38 stores map information and is used by the processor 34 when the processor 34 performs route guidance. The map information stored in the map information DB 38 is greater in quantity and finer in quality than the map information stored in the map information DB 28 of the navigation apparatus 14. The map information stored in the map information DB 38 includes congestion information, construction information, speed limit information, etc., for example.

The toll DB 40 stores information about tolls {including toll information of an ETC (Electronic Toll Collection System)} related to the map information stored in the map information DB 28. The toll DB 40 is used to indicate a toll for a server route which is recommended by the server 16.

The fuel consumption information DB 42 stores information representative of an association between the map information stored in the map information DB 28 and carbon dioxide emissions (fuel consumption information). The fuel consumption information DB 42 is used when the server searching conditions include a "fuel efficient mode" (to be described later), etc.

[Route Guidance Mode, Server Searching Conditions, and Tentative Searching Conditions]

As described above, the navigation apparatus 14 according to the present embodiment causes the server 16 to search for a route up to a destination and performs route guidance based on the server route indicated by the server 16. Alternatively, the navigation apparatus 14 can search for a route by itself, rather than causing the server 16 to search for a route. According to the present embodiment, the former route guidance mode in which the navigation apparatus 14 causes the server 16 to search for a route is referred to as "route distribution mode", and the latter route guidance mode in which the navigation apparatus 14 searches for a route is referred to as "standalone route guidance mode". The user can select either the route distribution mode or the standalone route guidance mode by using the input/output device 22 (touch panel or the like) of the navigation apparatus 14.

If the route distribution mode is selected, then the navigation apparatus 14 searches for and presents a tentative route while the server 16 is searching for a server route according to the server searching conditions.

The server searching conditions according to the present embodiment include "fastest", "fastest (general road)", "smart route", "fuel efficient route", and "ETC discount route".

The "fastest" is a server searching condition for searching for a route along which the motor vehicle 12 can get to the destination in a shortest time, and the route may include a toll road (including an expressway). For the server searching condition "fastest", the server 16 mainly uses the map information DB 38 and the toll DB 40. The "fastest (general road)" is a server searching condition for searching for a route along which the motor vehicle 12 can get to the destination in a shortest time, using only a general road (a toll-free road), and the route does not include a toll road. For the server searching condition "fastest (general road)", the server 16 mainly uses the map information DB 38 and the toll DB 40.

The "smart route" is a server searching condition for searching for a route (recommended by the server 16) in view of a balanced combination of an expected time and toll (including an ETC discount) to be required to get to the destination. For the server searching condition "smart route", the server 16 mainly uses the map information DB 38 and the toll DB 40. The "fuel efficient route" is a server searching condition for searching for a route which minimizes carbon dioxide emissions (fuel consumption). For the server searching condition "fuel efficient route", the server 16 mainly uses the map information DB 38, the toll DB 40, and the fuel consumption information DB 42.

The "ETC discount route" is a server searching condition for searching for a route in view of an ETC discount in addition to the server searching condition "smart route" (a route for a reduced toll based on positive use of an ETC discount). For the server searching condition "ETC discount route", the server 16 mainly uses the map information DB 38 and the toll DB 40.

The tentative searching conditions according to the present embodiment include "standard" and "general road priority".

The "standard" is a tentative searching condition for searching for a route which minimizes a route cost from the departure point to the destination, as with the navigation apparatus disclosed in Japanese Patent No. 3368775. The "general road priority" is a tentative searching condition for searching for a route which also minimizes a route cost from the departure point to the destination, as with the tentative searching condition "standard", but excluding a toll road (including an expressway) in the calculation of the route cost.

According to the present embodiment, each of the server searching conditions is associated in advance with either one of the tentative searching conditions, and until the server 16 acquires a server route under a selected server searching condition, the navigation apparatus 14 performs route guidance under a tentative searching condition which is associated with the selected server searching condition.

FIG. 2 shows by way of example a specific association between the server searching conditions and the tentative searching conditions. According to the association shown in FIG. 2, the server searching conditions "fastest", "smart route", "fuel efficient route", and "ETC discount route" are associated with the tentative searching condition "standard", and the server searching condition "fastest (general road)" is associated with the tentative searching condition "general road priority". If any one of the server searching conditions other than "fastest (general road)" is selected, then the navigation apparatus 14 performs route guidance under the tentative searching condition "standard" until it receives a server route from the server 16. On the other hand, if the server searching condition "fastest (general road)" is selected, then the navigation apparatus 14 performs route guidance under the tentative searching condition "general road priority" until it receives a server route from the server 16.

According to the present embodiment, if the standalone route guidance mode is selected, then the navigation apparatus 14 searches for a route under one of the tentative searching conditions "standard" and "general road priority" described above. Therefore, at the time of starting the route guidance system 10, the user can select either the route distribution mode or the standalone route guidance mode using the input/output device 22 of the navigation apparatus 14. If the user selects the route distribution mode, then the use also selects any one of the server searching conditions "fastest", "fastest (general road)", "smart route", "fuel efficient route", and "ETC discount route". If the user selects the standalone route guidance mode, then the use also selects either one of the tentative searching conditions "standard" and "general road priority".

Figure 3:
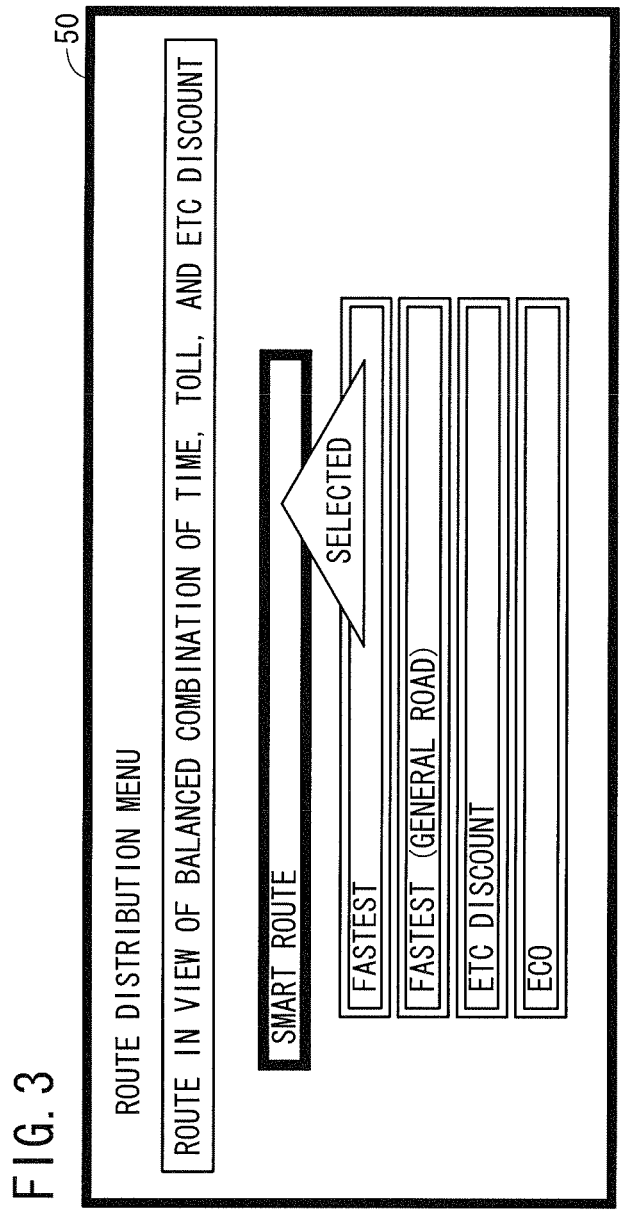
FIG. 3 is a view showing, by way of example, a screen representing a route distribution menu which is displayed by the navigation apparatus.

FIG. 3 shows, by way of example, a screen 50 of the touch panel that is part of the input/output device 22, representing a route distribution menu which is displayed for accepting the entry of a selected server searching condition. As shown in FIG. 3, the screen 50 displays a presently selected server searching condition which is boxed and highlighted in a different color, with the word "SELECTED" added thereto. The screen 50 also displays a description of the selected server searching condition.

Programs and data for the above route guidance modes, i.e., the route distribution mode and the standalone route guidance mode, are stored in the memory 26. The memory 26 also stores the association between the server searching conditions and the tentative searching conditions. According to the present embodiment, the tentative searching conditions are stored in the memory 26 at the time the motor vehicle 12 is shipped from the factory. However, as described later, the tentative searching conditions may also be distributed from the route distribution server 16.

[Updating and Saving Server Searching Conditions]

According to the present embodiment, the server searching conditions can be updated when needed. Specifically, when new server searching conditions are added to the existing server searching conditions "fastest", "fastest (general road)", "smart route", "fuel efficient route", and "ETC discount route", or any of the existing server searching conditions becomes unavailable, the navigation apparatus 14 can update server searching conditions that can be selected. At the same time, the association between the server searching conditions and the tentative searching conditions will be updated.

Figure 4:
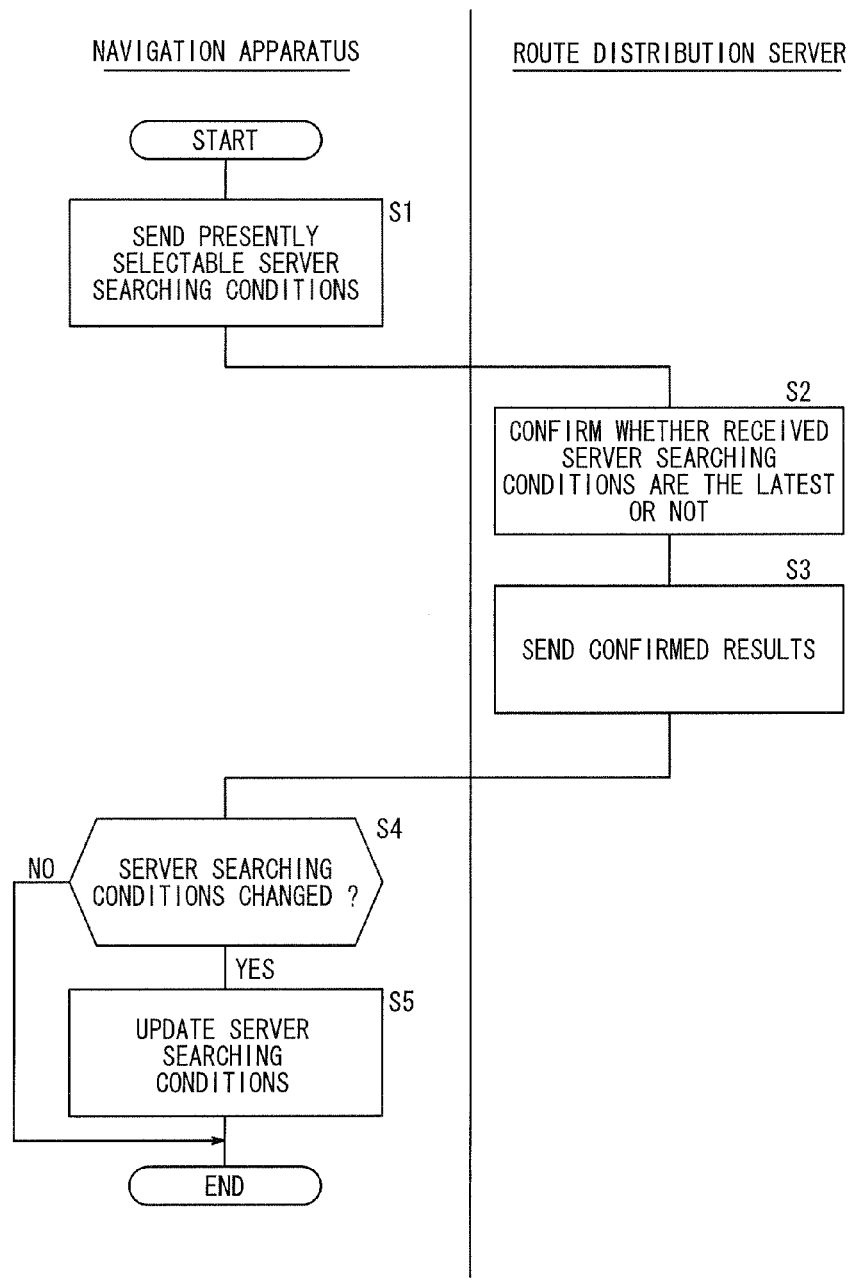
FIG. 4 is a flowchart of a processing sequence carried out by the navigation apparatus to update and save server searching conditions in the route guidance system.

FIG. 4 shows a flowchart of a processing sequence carried out by the navigation apparatus 14 to update and save server searching conditions in the route guidance system 10.

In step S1 shown in FIG. 4, the navigation apparatus 14 sends server searching conditions that can presently be selected to the server 16. The navigation apparatus 14 can send those presently selectable server searching conditions to the server 16 when it refers to contents such as news or acquires traffic information, for example. In step S2, the server 16 confirms whether the server searching conditions received from the navigation apparatus 14 are the latest or not. In step S3, the server 16 sends the confirmed results to the navigation apparatus 14. Specifically, if the server searching conditions received from the navigation apparatus 14 are not the latest, then the server 16 sends latest server searching conditions to the navigation apparatus 14. Conversely, if the server searching conditions received from the navigation apparatus 14 are the latest, then the server 16 notifies the navigation apparatus 14 accordingly.

In step S4, the navigation apparatus 14 confirms the data received from the server 16, i.e., whether the server searching conditions have been changed or not. If the navigation apparatus 14 have received new server searching conditions and hence the server searching conditions have been changed ("YES" in step S4), then the navigation apparatus 14 updates the present server searching conditions in step S5. The processing sequence is then ended. If the navigation apparatus 14 have not received new server searching conditions and hence the server searching conditions have not been changed ("NO" in step S4), then the processing sequence is ended.

[Route Guidance]

Figure 5:
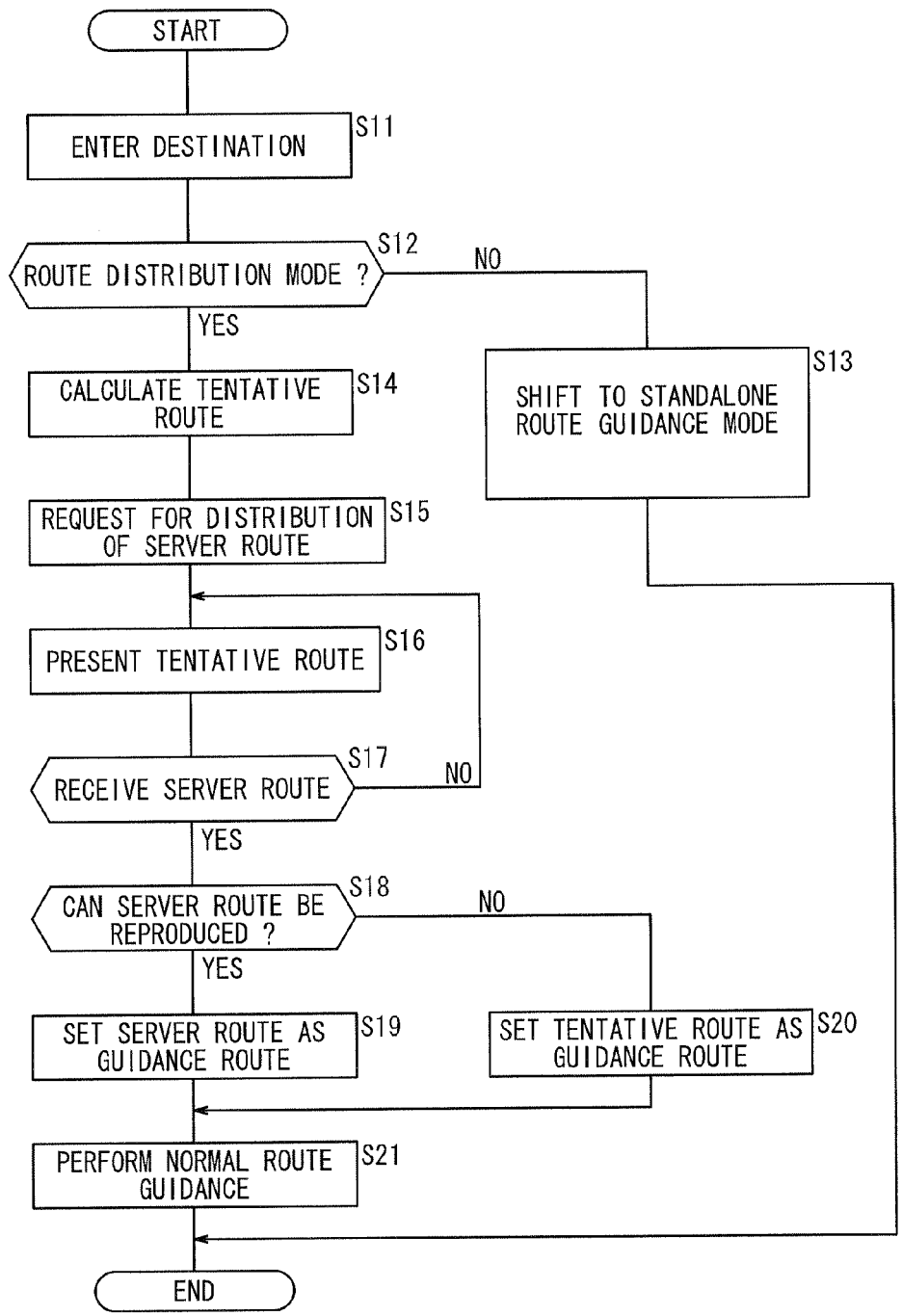
FIG. 5 is a flowchart of a processing sequence carried out by the navigation apparatus to perform route guidance in the route guidance system.

FIG. 5 is a flowchart of a processing sequence carried out by the navigation apparatus 14 to perform route guidance in the route guidance system 10. Before the navigation apparatus 14 starts to perform route guidance, the user needs to select one of the route guidance modes and one of the server searching conditions.

In step S11 shown in FIG. 5, the navigation apparatus 14 accepts the entry of a destination for the motor vehicle 12. In addition, the navigation apparatus 14 may accept the entry of a departure point other than the present position of the motor vehicle 12 and the entries of points through which the motor vehicle 12 is to travel to the destination.

In step S12, the navigation apparatus 14 determines whether the route distribution mode is selected as a route guidance mode or not. If the route distribution mode is not selected as a route guidance mode ("NO" in step S12), then the standalone route guidance mode ("standard" or "general road priority") is selected as a route guidance mode. In step S13, therefore, the navigation apparatus 14 shifts to the standalone route guidance mode, and puts an end to the processing sequence without sending a request for the distribution of a server route to the server 16.

If the route distribution mode is selected as a route guidance mode ("YES" in step S12), then the navigation apparatus 14 calculates a tentative route from the departure point to the destination based on a tentative searching condition ("standard" or "general road priority") which is associated with the server searching condition that has already been selected.

In step S15, the navigation apparatus 14 sends a request for the distribution of a server route to the server 16. At this time, the navigation apparatus 14 sends the departure point and the destination of the navigation apparatus 14 (the motor vehicle 12) and the server searching condition to the server 16. In response to the request, the server 16 searches for a server route based on the departure point, the destination, and the server searching condition transmitted from the navigation apparatus 14, and distributes the server route that has been found to the navigation apparatus 14.

In step S16, the navigation apparatus 14 presents the tentative route to the user. In step S17, the navigation apparatus 14 confirms whether it has received a server route from the server 16 or not. If the navigation apparatus 14 has not received a server route from the server 16 ("NO" in step S17), then the navigation apparatus 14 continuously presents the tentative route to the user. Conversely, if the navigation apparatus 14 has received a server route from the server 16 ("YES" in step S17), then control goes to step S18.

In step S18, the navigation apparatus 14 determines whether the received server route can be reproduced or not. If the received server route can be reproduced ("YES" in step S18), then the navigation apparatus 14 sets the reproduced server route as a route (guidance route) to be formerly presented to the user. Conversely, if the received server route cannot be reproduced ("NO" in step S18), then the navigation apparatus 14 sets the present tentative route as a guidance route to be formerly presented to the user (step S20), or in other words, uses the present tentative route unchanged.

Figure 6:
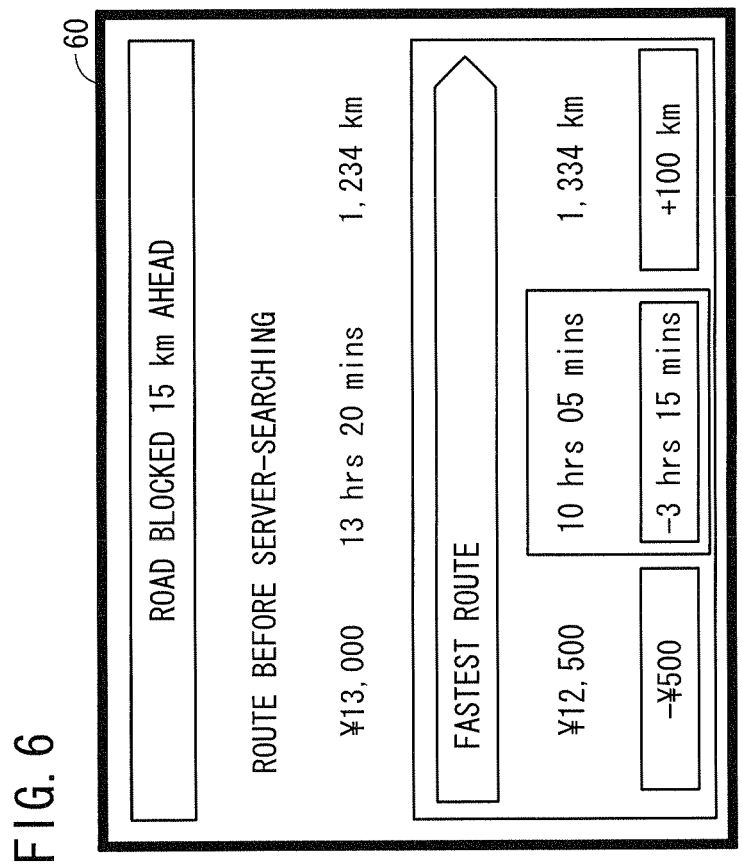
FIG. 6 is a view showing, by way of example, a screen representing the effectiveness of a server route which is displayed by the navigation apparatus.

In step S21, the navigation apparatus 14 uses the guidance route set in step S19 or step S20 for normal route guidance. If the navigation apparatus 14 uses the server route for route guidance, then the navigation apparatus 14 temporarily displays a screen 60 shown in FIG. 6. In FIG. 6, the screen 60 shows the effectiveness of the server route, with the server searching condition "fastest" being selected, for example. Specifically, the screen 60 displays different costs and times which will be taken from the departure point to the destination, and different distances from the departure point to the destination respectively under the server searching condition and the tentative searching condition. The screen 60 thus allows the user to recognize how the route guidance under the server searching condition is effective.

[Advantages of the Present Embodiment]

According to the present embodiment, as described above, the navigation apparatus 14 can search for a tentative route under the tentative searching condition that is associated with the server searching condition selected by the user. Therefore, it is possible to search for a tentative route which is closer to what the user intends.

According to the present embodiment, a plurality of tentative searching conditions include a condition ("standard") which permits the use of a toll road and a condition ("general road priority") which permits the use of a toll-free road only. The navigation apparatus 14 associates each of a plurality of server searching conditions with either one of the tentative searching conditions "standard" and "general road priority". Therefore, only when the user permits the use of a toll road, the navigation apparatus 14 can perform route guidance including a toll road in a tentative route. Stated otherwise, when the user does not want the use of a toll road, the navigation apparatus 14 performs route guidance with no toll road included in a tentative route. Consequently, the navigation apparatus 14 is capable of searching for a tentative route which is closer to what the user intends.

According to the present embodiment, the route distribution server 16 distributes a plurality of server searching conditions and also an association between those server searching conditions and a plurality of tentative searching conditions to the navigation apparatus 14. Therefore, even if server searching conditions in the navigation apparatus 14 have changed, the association between the server searching conditions and the tentative searching conditions can be updated when needed.

[Modifications]

The present invention is not limited to the illustrated embodiment described above. Various modifications may be made in view of the principles of the present invention, as described below.

In the illustrated embodiment, the navigation apparatus 14 is incorporated in the motor vehicle 12. However, the navigation apparatus 14 may be incorporated in any of various other mobile objects such as a ship, an aircraft, a cellular phone, or the like.

In the illustrated embodiment, the navigation apparatus 14 receives a plurality of server searching conditions from the server 16 in advance (see FIG. 4). However, the navigation apparatus 14 may receive a plurality of server searching conditions from the server 16 when the user selects a server searching condition.

Although certain preferred embodiments of the present invention have been shown and described in detail, it should be understood that various changes and modifications may be made therein without departing from the scope of the appended claims.

What is claimed is:

1. A navigation apparatus configured to send a departure point, a destination, and a server searching condition to a route distribution server for enabling the route distribution server to search for a server route from the departure point to the destination, to receive the server route which has been searched for by the route distribution server based on the departure point, the destination, and the server searching condition, and to perform route guidance based on the server route, comprising:
    a server searching condition receiver configured to receive a plurality of server searching conditions from the route distribution server;
    a server searching condition selector configured to select one of the server searching conditions based on an action of a user of the navigation apparatus; and
    a tentative route searcher configured to search for a tentative route from the departure point to the destination after the destination is set, before the navigation apparatus receives the server route and before the route guidance based on the server route is started,
    wherein the navigation apparatus is configured to perform route guidance under the tentative route searched for by the navigation apparatus itself until the navigation apparatus receives the server route,
    wherein each of the server searching conditions is associated with a tentative searching condition used to search for the tentative route, and
    the tentative route searcher is configured to search for the tentative route under the tentative searching condition which is associated with one of the server searching conditions which is sent to the route distribution server, whereafter the navigation apparatus is configured to perform route guidance under the server route.

2. A navigation apparatus according to claim 1, further comprising a route searching condition memory configured to store a plurality of the tentative searching conditions, wherein the tentative searching condition which is associated with one of the server searching conditions that is received from the route distribution server is stored as one of the tentative searching conditions stored in the route searching condition memory.

3. A navigation apparatus according to claim 1, wherein the tentative searching conditions include a condition which permits use of a toll road and a condition which permits use of a toll-free road only, and each of the server searching conditions is associated with either one of the condition which permits the use of a toll road and the condition which permits the use of a toll-free road only.

4. The navigation apparatus according to claim 1, wherein the navigation apparatus is configured to update the server searching conditions when the navigation apparatus receives new server searching conditions from the route distribution server.

5. The navigation apparatus according to claim 1, wherein the navigation apparatus is configured to update the server searching conditions when an existing server searching condition becomes unavailable.

6. A route distribution server configured to receive, via a communication device, from a navigation apparatus, a departure point, a destination, and a server searching condition selected by a user of the navigation apparatus for searching for a server route from the departure point to the destination, to search for, via a processor, the server route that is a route obtained based on the departure point, the destination, and the server searching condition, and to distribute, via the communication device, the server route which has been searched for to the navigation apparatus, the route distribution server further comprising:
    a searching condition distributor configured to distribute to the navigation apparatus, via the communication device, a plurality of server searching conditions and a plurality of tentative searching conditions, wherein the tentative search conditions distributed by the searching condition distributor are each associated with at least one of the server searching conditions and are each adapted to be used by the navigation apparatus to search for a tentative route from the departure point to the destination.

* * * * *